(No Model.)

C. J. B. WARD.
Automatic Clutch.

No. 241,460. Patented May 10, 1881.

Attest:
Aug. L. Jordan
L. H. Marshall

Inventor:
C. J. B. Ward
By his Atty R. D. Smith

N. PETERS, Photo-Lithographer, Washington, D. C.

UNITED STATES PATENT OFFICE.

CHARLES JAMES BERRILL WARD, OF ROOD LANE, LONDON, ENGLAND.

AUTOMATIC CLUTCH.

SPECIFICATION forming part of Letters Patent No. 241,460, dated May 10, 1881.

Application filed January 12, 1881. (No model.)

*To all whom it may concern:*

Be it known that I, CHARLES JAMES BERRILL WARD, of Rood Lane, in the city of London, England, engineer, have invented new and useful Improvements in Automatic Clutches, of which the following is a clear and exact description.

Figure 1:
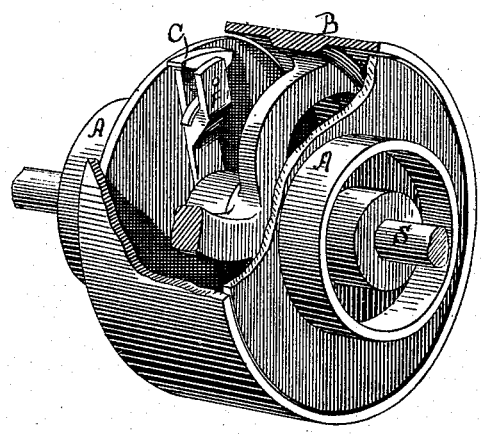
Figure 2:
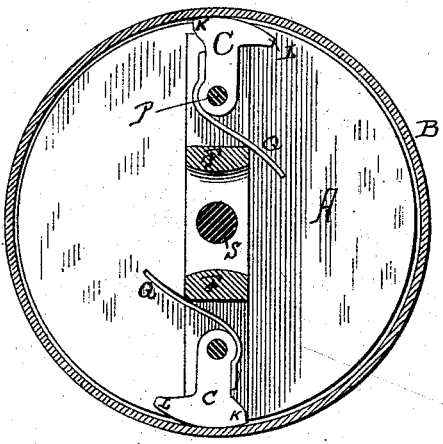

Figure 1 is a sectional perspective of my improvement. Fig. 2 is a transverse section of the same. Figs. 3, 4, 5, and 6 represent modified structures of the same.

Figure 3:
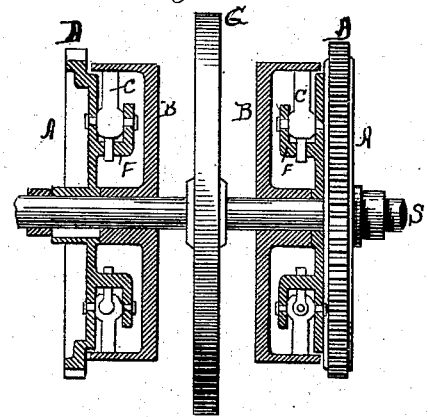

The object of my invention is to convert reciprocating rectilinear motion into constant relative motion in a simple and effective manner, while at the same time the travel or stroke of the reciprocating motion can be varied at will without affecting the regular rotative action of the driven shaft. To effect this object I use an improved double clutch, in which the reciprocating motion may be communicated by cords, straps, wire, chain, or rack gearing to two drums or disks, causing them to rotate in opposite directions corresponding to the relative directions of the reciprocating motion. The drums A A receive the direct action of the reciprocating motion. In Figs. 1 and 2 the arrangement is suitable for the communication of the reciprocating power by cords, straps, wire, or chains on the drums A A. In Fig. 3 the reciprocating power would be communicated by racks and the exterior gearing, D D. All these drums A A, which receive the direct action of the reciprocating motion, (which may be produced by treadles, cranks, pistons, or any suitable means,) are arranged to revolve loosely around the shaft S S. Each of these drums A A carries a cam or cams, C C, in a fork or bracket, F, so as to form a griping-clutch in only one direction of rotation on the inside face of the other drums, B B, substantially as shown.

In Figs. 1 and 2 the central drum, B B, may be securely keyed to the shaft S S, or allowed to run loose upon it, as required, and a constant direction of rotation is given to the drum, and thereby to both drum and shaft, if keyed together, by the alternate griping action of the cam-gripes in one direction only, carried on the reciprocating drums A. The outside surface of the central drum, B, in Figs. 1 and 2 may be either suited to drive a constant rotating shaft or drum by a band, strap, chain, or cord, or be fitted with gearing.

In Fig. 3 the drum B is divided into two parts, each keyed to the shaft S, and each part driven alternately by the alternate action of the cam-gripes carried on the outside drums, A A, as above described. This divided arrangement of the central drum, B, enables a wheel, G, toothed or otherwise, to be securely fixed or keyed to the shaft S, so that the constant rotative motion produced may be communicated by said wheel G to any other gearing it may be desired to drive. In these arrangements the direct reciprocating motion is communicated to the drums A A, as hereinbefore described, and from them is passed through the cam-gripes C C, carried by the said drums A A, to the interior surface of the drum or drums B B, where the frictional gripe takes effect.

Figure 4:
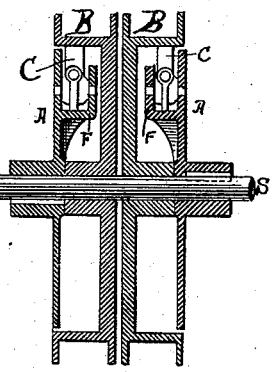
Figure 5:
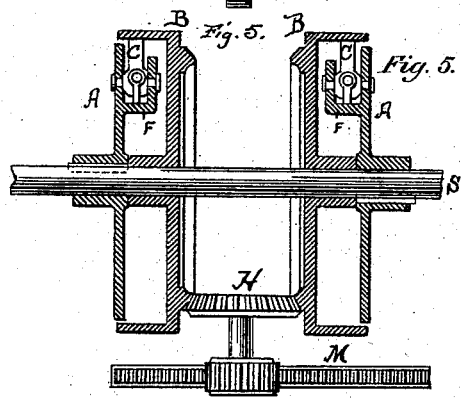
Figure 6:
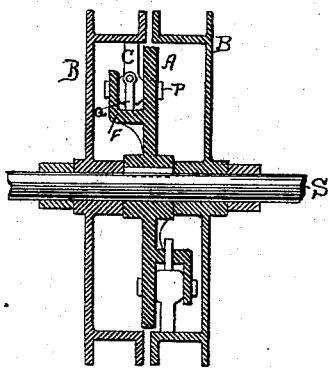

In Figs. 4, 5, 6, B B B are the drums which receive the reciprocating power direct, and are thus, as before, arranged to run loosely on the shaft S S. In these latter arrangements, however, the reciprocating drums do not carry the cam-gripes, as in Figs. 1 and 2, but the cam-gripes C C are here carried on the disks A A A, which are keyed to the shaft S S S. In these latter cases the reciprocating motions are thus alternately communicated in one direction only from the interior circumferences of the reciprocating drums B B to the cam-gripes C C, and from them to the keyed disks A A, on which they are carried by the brackets F F, and which, in the illustrations, are themselves keyed to the shaft S S, which thus receives constant rotative motion from each disk alternately.

In Fig. 4 the reciprocating drums B B are suited to receive their motion from a cord pulley, strap, wire, or chain, and in Fig. 6 a single disk being substituted between the two reciprocating drums, and carrying both or all the cam-gripes. In Fig. 5 the reciprocating drums B B are arranged to receive their motion from a bevel-gearing, H, and a reciprocating rack-and-pinion motion, M.

The cam-gripe C is fixed in the bracket F by the pin P, on which it turns, and is held up against the interior surface of a drum, B, by the spring Q. The back end, L, of the cam-gripe extends considerably over the center, P, and has a slightly longer radius from its center P than the front edge, K, at which point K the cam-gripe bears slightly on the interior surface of drum B, so that when the motion of the exterior drum, B, is, as shown by the arrow, from L to K, the cam acts as a wedge and clutches or gripes between its center P and the interior surface of B, being kept to its bearing by the spring Q, and consequently is perfectly automatic in its action. When the motion of the exterior drum, B, is in the opposite direction, from K to L, the cam slides without griping on the interior face of the drum B.

The cam-gripes may be covered by leather or other suitable material as a griping-face, or they may be made of wood, metal, or other suitable material without special face.

Any number of cam-gripes may be used on a drum or disk to give any required number of griping-points to insure a firm frictional hold.

One especial advantage of this arrangement of cam-gripe is that the clutch is effected at the greatest possible distance from the center of motion, so that the gripe is almost instantaneous. At the same time the connection is made at the position of greatest mechanical advantage, so that the least possible amount of griping-clutch will suffice to communicate the power.

Having described my invention, what I claim as new is—

1. The shaft S, with one or more cam-clutch bearing disks or drums rigidly secured thereto and facing outward, combined with one or more drums or disks with laterally-projecting peripheral flanges arranged to inclose and engage with said clutch-cams, as set forth.

2. The shaft S and cam-clutches C, pivoted thereto, facing outward in the plane of revolution, combined with a disk or drum provided with a laterally-projecting peripheral flange adapted to inclose and engage with said cam in a plane concentric with the axis of revolution.

3. The shaft S, having the disks A mounted thereon and provided with the brackets F, combined with the cam-clutches C, pivoted in said brackets, spring Q, whereby the cams are made automatic, and the disks or drums B.

4. The shaft S, with the cam bearing-disks C mounted rigidly thereon, and the drums or disks B mounted loosely thereon and in engagement with said cams, combined with the reciprocating rack M and pinion H, driven thereby, and communicating a reciprocating rotation to said drums B, as and for the purpose set forth.

5. A pulley, B, mounted loosely upon the shaft S, and a hub, $a$, provided with a disk or arm, A, combined with the cam-faced dog C, pivoted to said arm or disk, and kept in engagement with the inner surface of said pulley by a spring, Q, substantially as and for the purpose set forth.

CHARLES JAMES BERRILL WARD.

In presence of—
I. C. FELL,
S. P. WILDING.